US008275392B2

(12) United States Patent
Iwamura et al.

(10) Patent No.: US 8,275,392 B2
(45) Date of Patent: Sep. 25, 2012

(54) TRACE REPORTING METHOD, TRACKING AREA ASSIGNING METHOD, USER TERMINAL, BASE STATION, AND TRACKING AREA MANAGEMENT APPARATUS

(75) Inventors: Mikio Iwamura, Yokohama (JP); Takehiro Nakamura, Yokohama (JP); Yasuhiro Kato, Yokohama (JP); Yoshitsugu Shimazu, Kawasaki (JP); Masayuki Motegi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 388 days.

(21) Appl. No.: 12/524,139

(22) PCT Filed: Jan. 31, 2008

(86) PCT No.: PCT/JP2008/051475
§ 371 (c)(1), (2), (4) Date: Sep. 23, 2009

(87) PCT Pub. No.: WO2008/093765
PCT Pub. Date: Aug. 7, 2008

(65) Prior Publication Data

US 2010/0029298 A1 Feb. 4, 2010

(30) Foreign Application Priority Data

Feb. 1, 2007 (JP) ................................ 2007-023462

(51) Int. Cl.
*H04W 64/00* (2009.01)

(52) U.S. Cl. ............... 455/456.1; 455/456.2; 455/456.5; 455/456.6; 455/458

(58) Field of Classification Search ............... 455/456.1, 455/456.2, 456.3, 456.4, 456.5, 456.6, 458
See application file for complete search history.

(56) References Cited

U.S. PATENT DOCUMENTS 6,125,278 A * 9/2000 Wieczorek et al. ........... 455/437
2001/0034232 A1* 10/2001 Kuwahara ..................... 455/435
2007/0232320 A1* 10/2007 Casati et al. ............... 455/456.1

FOREIGN PATENT DOCUMENTS

JP 7-322333 A 12/1995
JP 2000-023234 A 1/2000
JP 2003-259412 A 9/2003

(Continued)

OTHER PUBLICATIONS

3GPP TSG RAN WG2 Ad Hoc on LTE, Tdoc-R2-061929, Cannes, France, Jun. 27-30, 2006, "Standardisation policy for plug and play RAN," 4 pages.

(Continued)

*Primary Examiner* — Dwayne Bost
*Assistant Examiner* — William F Rideout
(74) *Attorney, Agent, or Firm* — Osha Liang LLP

(57) ABSTRACT

A trace reporting method, in which a user terminal reports to a tracking area management apparatus a trace along which the user terminal has moved in a mobile communication system, includes the steps of storing, by the user terminal, identifiers of base stations where the user terminal has performed cell selection in an identifier storage unit; and reporting, by the user terminal, to the tracking area management apparatus the identifiers stored in the identifier storage unit upon communicating with a base station. The tracking area management apparatus may compare the reported identifiers with a pre-stored pattern and assign a tracking area to the user terminal based on the comparison.

9 Claims, 15 Drawing Sheets

| MME | |
|---|---|
| TA#1 | eNB#11,eNB#12... |
| TA#2 | eNB#21,eNB#22... |
| TA#3 | eNB#31,eNB#32... |
| ... | ... |
| UE#1 | TA#2,TA#4 |
| UE#2 | TA#3 |
| UE#3 | TA#4 |
| ... | ... |

TA#1
TA#2
TA#3
TA#4
eNB#11
eNB#12
UE#1
eNB#21
TA#2
TA#4
eNB#41
eNB#42

FOREIGN PATENT DOCUMENTS

JP 2004-023146 A 1/2004

OTHER PUBLICATIONS

3GPP TS 23.122 V7.7.0, Dec. 2006, "Non-Access-Stratum (NAS) functions related to Mobile Station (MS) in idle mode," 34 pages.

3GPP TS 23.060 V6.15.0, Dec. 2006, General Packet Radio Service (GPRS); Service description, 209 pages.

International Search Report issued in PCT/JP2008/051475, mailed on May 13, 2008, with translation, 5 pages.

Written Opinion issued in PCT/JP2008/051475, mailed on May 13, 2008, 4 pages.

* cited by examiner

TA#1
TA#2
TA#3
TA#4
eNB#11
eNB#12
eNB#21
UE#1
MME
TA#1 eNB#11,eNB#12...
TA#2 eNB#21,eNB#22...
TA#3 eNB#31,eNB#32...
UE#1 TA#2
UE#2 TA#3
UE#3 TA#4

TA#1
TA#2
TA#3
TA#4
eNB#11
eNB#12
eNB#21
eNB#41
eNB#42
UE#1
TA#2
TA#4
MME
TA#1 eNB#11,eNB#12...
TA#2 eNB#21,eNB#22...
TA#3 eNB#31,eNB#32...
UE#1 TA#2,TA#4
UE#2 TA#3
UE#3 TA#4

TA#1
TA#2
TA#5
TA#3
TA#4
eNB#11
eNB#12
eNB#21
eNB#41
eNB#42
UE#1
TA#5
MME
TA#1 eNB#11,eNB#12...
TA#2 eNB#21,eNB#22...
TA#5 eNB#21,eNB#41, eNB42...
UE#1 TA#5
UE#2 TA#3
UE#3 TA#4

200
TRANSMISSION RF UNIT
211
BROADCAST INFORMATION GENERATING UNIT
209
205
· ON/OFF FOR REPORTING
· MAXIMUM NUMBER OF CELL IDS
· MAXIMUM TIME PERIOD FOR REPORTING
· REPORTING RATE
DCH
BCH
RECEPTION RF UNIT
201
RRC PROCESSING UNIT
207
NW INTERFACE UNIT
TRACKING AREA MANAGEMENT APPARATUS
CELL ID LIST FORWARDING UNIT
203

300
TA_ID ASSIGNMENT INFORMATION STORAGE UNIT
307
UE#1 TA#2,TA#4...
UE#2 TA#1,TA#3...
UE#3 TA#3,TA#5...
TA DESIGN INFORMATION STORAGE UNIT
309
TA#1 eNB#11,eNB#12...
TA#2 eNB#21,eNB#22...
TA#3 eNB#31,eNB#32...
PATTERN STORAGE UNIT
311
eNB#11 0
eNB#12 ±Δ1
eNB#21 ±Δ2
TA TO BE ASSIGNED TA#2,TA#4
NAS PROTOCOL PROCESSING UNIT
303
CONTROL UNIT
305
NW INTERFACE UNIT
301
BASE STATION

TA#1
TA#2
TA#3
TA#4
eNB#11
eNB#12
eNB#21
eNB#41
eNB#42
UE#1
MME
TA#1 eNB#11,eNB#12,eNB#21,eNB#41,eNB#42
TA#2 eNB#13,eNB#14,eNB#22...
TA#3 eNB#31,eNB#32...
...
UE#1 TA#1
UE#2 TA#3
UE#3 TA#4
...

200
RECEPTION RF UNIT
201
TRANSMISSION RF UNIT
211
DCH
BCH
CELL ID LIST FORWARDING UNIT
203
RRC PROCESSING UNIT
207
BROADCAST INFORMATION GENERATING UNIT
209
NW INTERFACE UNIT
205
TA_ID SETTING UNIT
213
· ON/OFF FOR REPORTING
· MAXIMUM NUMBER OF CELL IDs
· MAXIMUM TIME PERIOD FOR REPORTING
· REPORTING RATE
TRACKING AREA MANAGEMENT APPARATUS 300
311
PATTERN STORAGE UNIT
eNB#11,eNB#12...
eNB#21,eNB#22...
eNB#31,eNB#32...
309
TA DESIGN INFORMATION STORAGE UNIT
TA#1 eNB#11,eNB#12...
TA#2 eNB#21,eNB#22...
TA#3 eNB#31,eNB#32...
307
TA_ID ASSIGNMENT INFORMATION STORAGE UNIT
UE#1 TA#2,TA#4...
UE#2 TA#1,TA#3...
UE#3 TA#3,TA#5...
305
CONTROL UNIT
303
NAS PROTOCOL PROCESSING UNIT
301
NW INTERFACE UNIT
BASE STATION
313
TA_ID SETTING UNIT

TRACE REPORTING METHOD, TRACKING AREA ASSIGNING METHOD, USER TERMINAL, BASE STATION, AND TRACKING AREA MANAGEMENT APPARATUS

TECHNICAL FIELD

The present invention relates a technical field of mobile communications. Specifically, the present invention relates to a method of reporting a trace along which a user terminal has performed cell selection in a mobile communication system, a method of assigning a tracking area in a tracking area management apparatus, a corresponding user terminal, a corresponding base station, and a corresponding tracking area management apparatus.

BACKGROUND ART

In a mobile communication system, a user terminal is registered in the network as a unit of a tracking area (TA), a location area (LA), or a routing area (RA), in order to originate and receive a call in any cell. When a user terminal in standby status (idle mode) receives a call, all of the base stations within the tracking area place (originate) the call to the user terminal. For this reason, the user terminal has to perform tracking area update (TAU) with a tracking area management apparatus every time the user terminal changes tracking areas (see TS23.060 ver 6.15.0).

FIG. 1 shows mobile communication system architecture in accordance with LTE (Long Term Evolution) which is under discussion in 3GPP (The 3rd Generation Partnership Project). An apparatus which is an upper node of the base station (eNB) manages tracking areas. This apparatus is also referred to as a MME (Mobile Management Entity). The base station (eNB) belongs to one of tracking areas (TA). When the user terminal (UE) moves from the base station eNB#12 belonging to the tracking area TA#1 to the base station eNB#21 belonging to the tracking area TA#2, the user terminal (UE) performs tracking area update with the MME via the base station eNB#21.

DISCLOSURE OF INVENTION

Problem(s) to be Solved by the Invention

When the tracking area is designed to be smaller, the number of base stations which place a call to a user terminal becomes smaller, and thus the workload of paging becomes lower. However, in the case of a smaller tracking area, the workload of tracking area update becomes higher, since the user terminal has to perform tracking area update every time the user terminal changes tracking areas. When the tracking area is designed to be larger, on the other hand, the workload of tracking area update becomes lower. However, the workload of paging becomes higher. In this manner, there is a trade-off relationship between the workload of tracking area update and the workload of paging. Conventionally, network operators design tracking areas through desk checks or field tests, in order to determine optimum tracking areas. However, there is a problem in that this design is complicated and cannot be modified with flexibility.

According to LTE which is under discussion in 3GPP, it is contemplated to assign multiple tracking areas to a user terminal (UE) (multi-location registration). For example, multiple tracking areas are assigned to a fast-moving user terminal and a single tracking area is assigned to a less-moving user terminal. Alternatively, according to LTE, it is also contemplated that a base station belongs to multiple tracking areas (overlapping location registration). However, there is a problem in that tracking areas cannot be assigned to a user terminal with flexibility according to the conventional design by network operators.

In order to solve at least one of the problems in the related art, it is a general object of the present invention to efficiently design or assign tracking areas.

Means for Solving the Problem(s)

In one aspect of the present invention, there is provided a trace reporting method in which a user terminal reports to a tracking area management apparatus a trace along which the user terminal has moved in a mobile communication system, including the steps of:

storing, by the user terminal, identifiers of base stations where the user terminal has performed cell selection in an identifier storage unit; and reporting, by the user terminal, to the tracking area management apparatus the identifiers stored in the identifier storage unit upon communicating with a base station.

In another aspect of the present invention, there is provided a tracking area assigning method in which a user terminal reports to a tracking area management apparatus a trace along which the user terminal has moved in a mobile communication system and the tracking area management apparatus assigns a tracking area to the user terminal, including the steps of:

storing, by the user terminal, identifiers of base stations where the user terminal has performed cell selection in an identifier storage unit;

reporting, by the user terminal, to the tracking area management apparatus the identifiers stored in the identifier storage unit upon communicating with a base station; and comparing, by the tracking area management apparatus, the reported identifiers with a prestored pattern and assigning the tracking area to the user terminal based on the comparison.

In another aspect of the present invention, there is provided a user terminal for reporting to a tracking area management apparatus a trace along which the user terminal has moved in a mobile communication system, including:

an identifier storage unit configured to store identifiers of base stations where the user terminal has performed cell selection; and a trace reporting unit configured to report to the tracking area management apparatus the identifiers stored in the identifier storage unit upon communicating with a base station.

In another aspect of the present invention, there is provided a base station connected to a tracking area management apparatus and capable of communicating with a user terminal in a mobile communication system, including:

a report parameter notifying unit configured to notify the user terminal of information about whether the user terminal needs to report to the tracking area management apparatus identifiers of base stations where the user terminal has performed cell selection; and an identifier forwarding unit configured to forward to the tracking area management apparatus the identifiers of the base stations which are received from the user terminal.

In another aspect of the present invention, there is provided a tracking area management apparatus for assigning a tracking area to a user terminal in a mobile communication system, including:

an identifier receiving unit configured to receive from a base station identifiers of base stations where the user terminal has performed cell selection; and a control unit configured to compare the received identifiers with a prestored pattern and assign the tracking area to the user terminal based on the comparison.

Advantageous Effect of the Invention

According to an embodiment of the present invention, it is possible to efficiently design or assign tracking areas.

DETAILED DESCRIPTION OF THE PREFERRED EMBODIMENTS

Description of Notations

Figure 1:
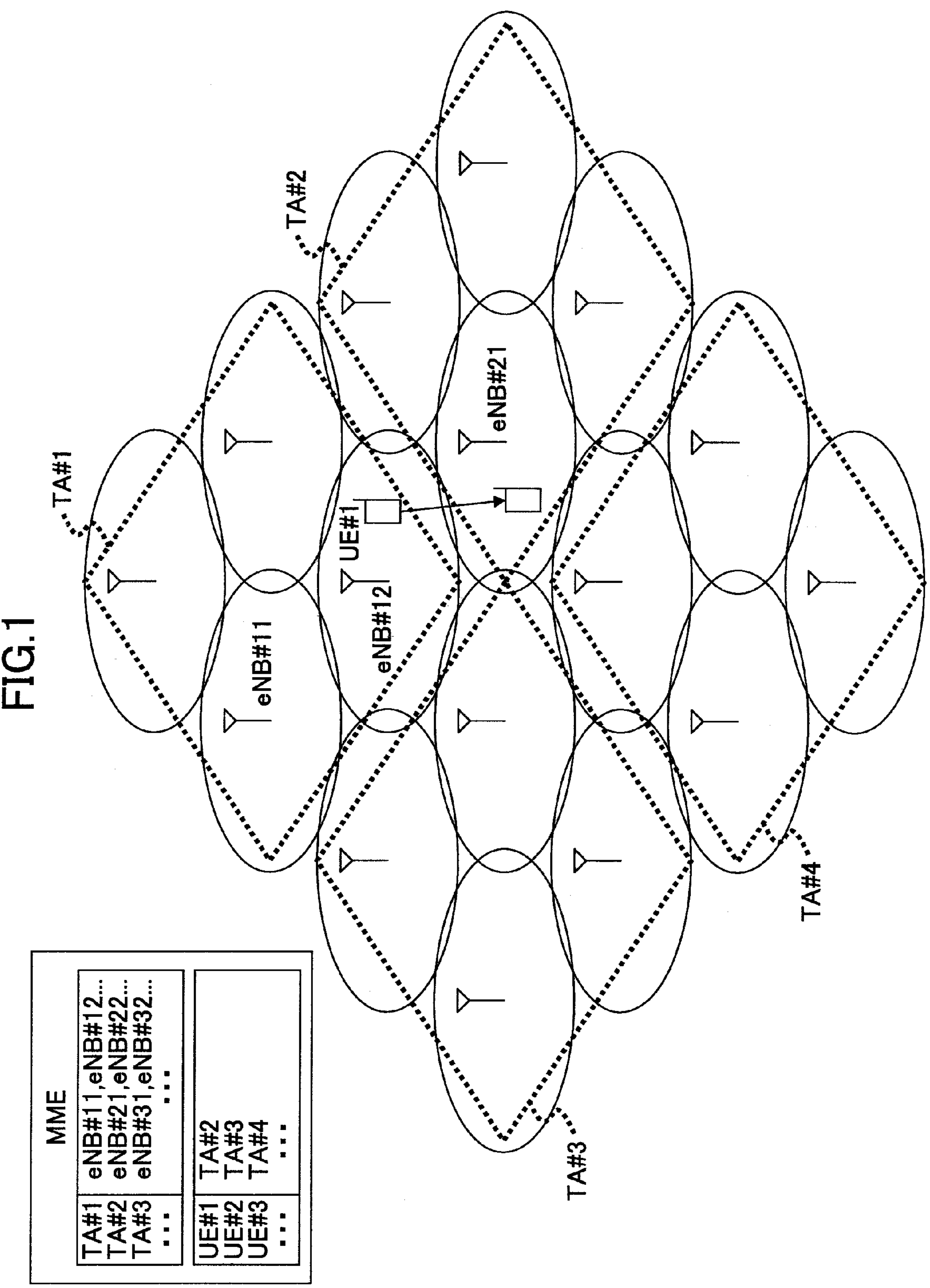
FIG. 1 shows mobile communication system architecture in accordance with LTE which is under discussion in 3GPP.

100 user terminal
101 reception RF unit
103 cell selection unit
105 broadcast information receiving unit
107 cell ID list storage unit
109 cell ID list reporting unit
111 transmission RF unit
200 base station
201 reception RF unit
203 cell ID list forwarding unit
205 NW interface unit
207 RRC processing unit
209 broadcast information generating unit
211 transmission RF unit
213 TA_ID setting unit
300 tracking area management apparatus
301 NW interface unit
303 NAS protocol processing unit
305 control unit
307 TA_ID assignment information storage unit
309 TA design information storage unit
311 pattern storage unit
313 TA_ID setting unit

BEST MODE OF CARRYING OUT THE INVENTION

With reference to the accompanying drawings, a description is given below with regard to preferred embodiments of the present invention.

First Embodiment

Efficiently Assigning Tracking Areas to User Terminals

Figure 2:
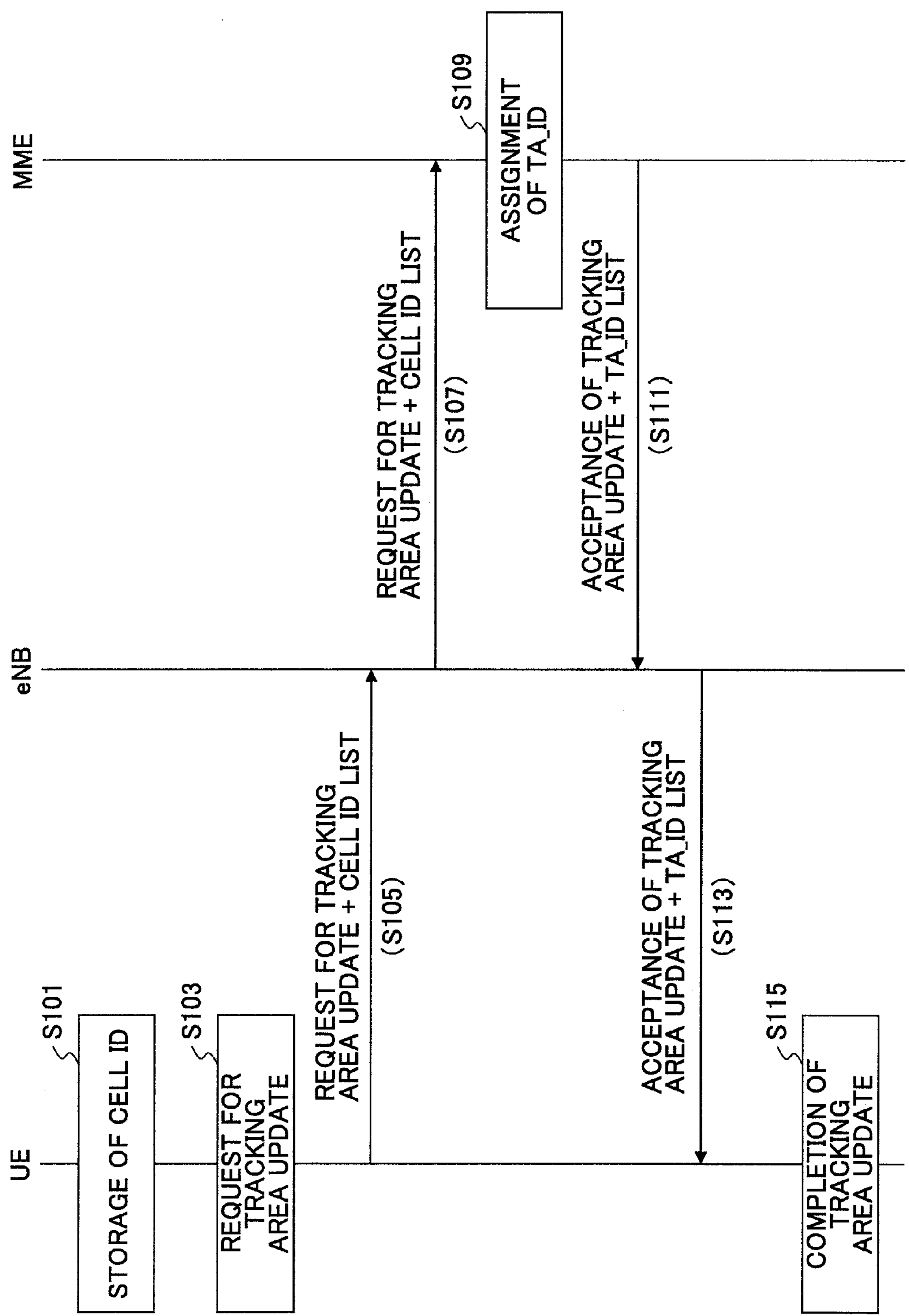
FIG. 2 shows a sequence diagram of a tracking area assigning method in accordance with a first embodiment of the present invention.
Figure 3A:
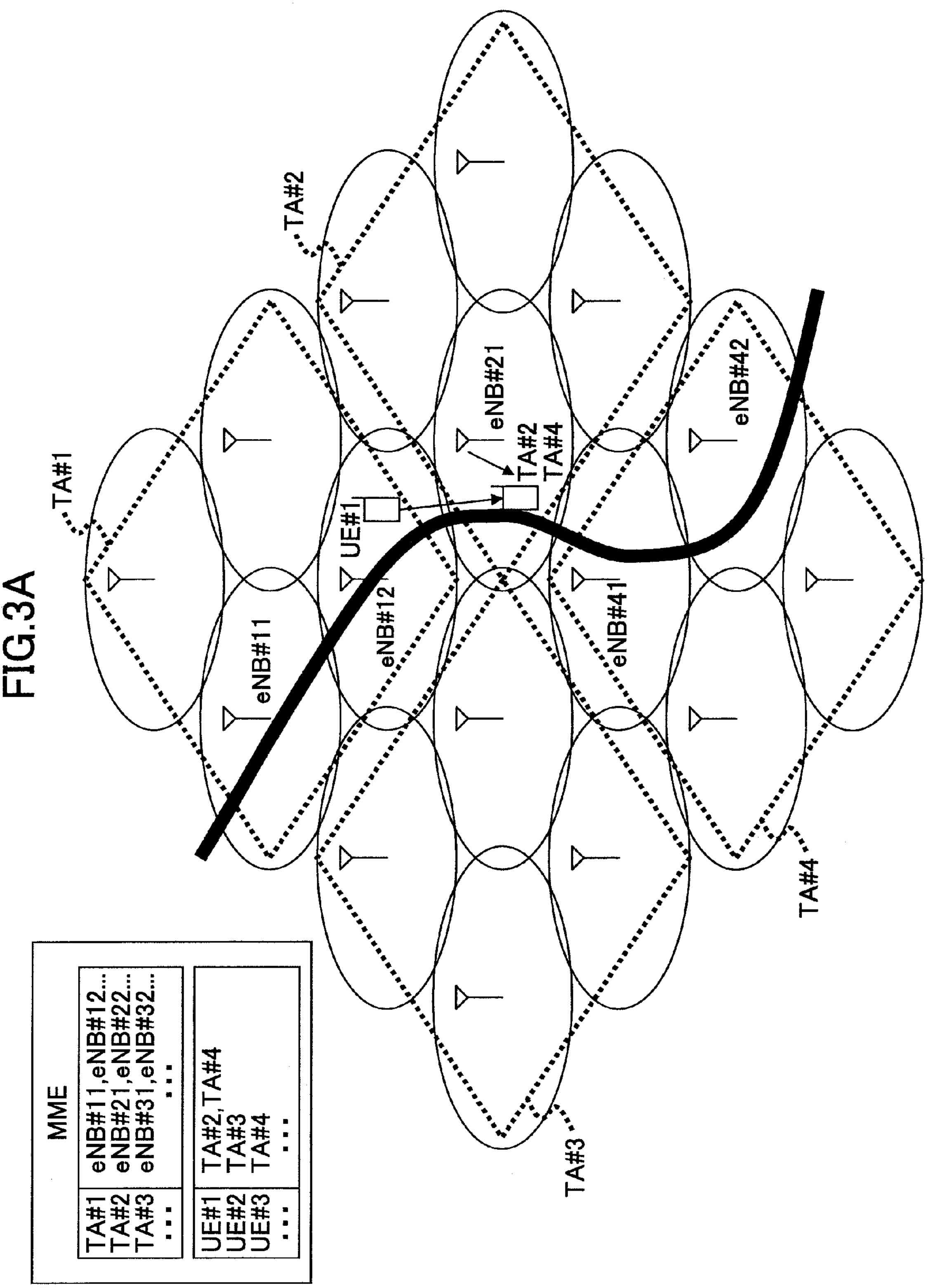
FIG. 3A shows an example of tracking areas assigned to user terminals in accordance with the first embodiment of the present invention (in the case of multi-location registration).
Figure 3B:
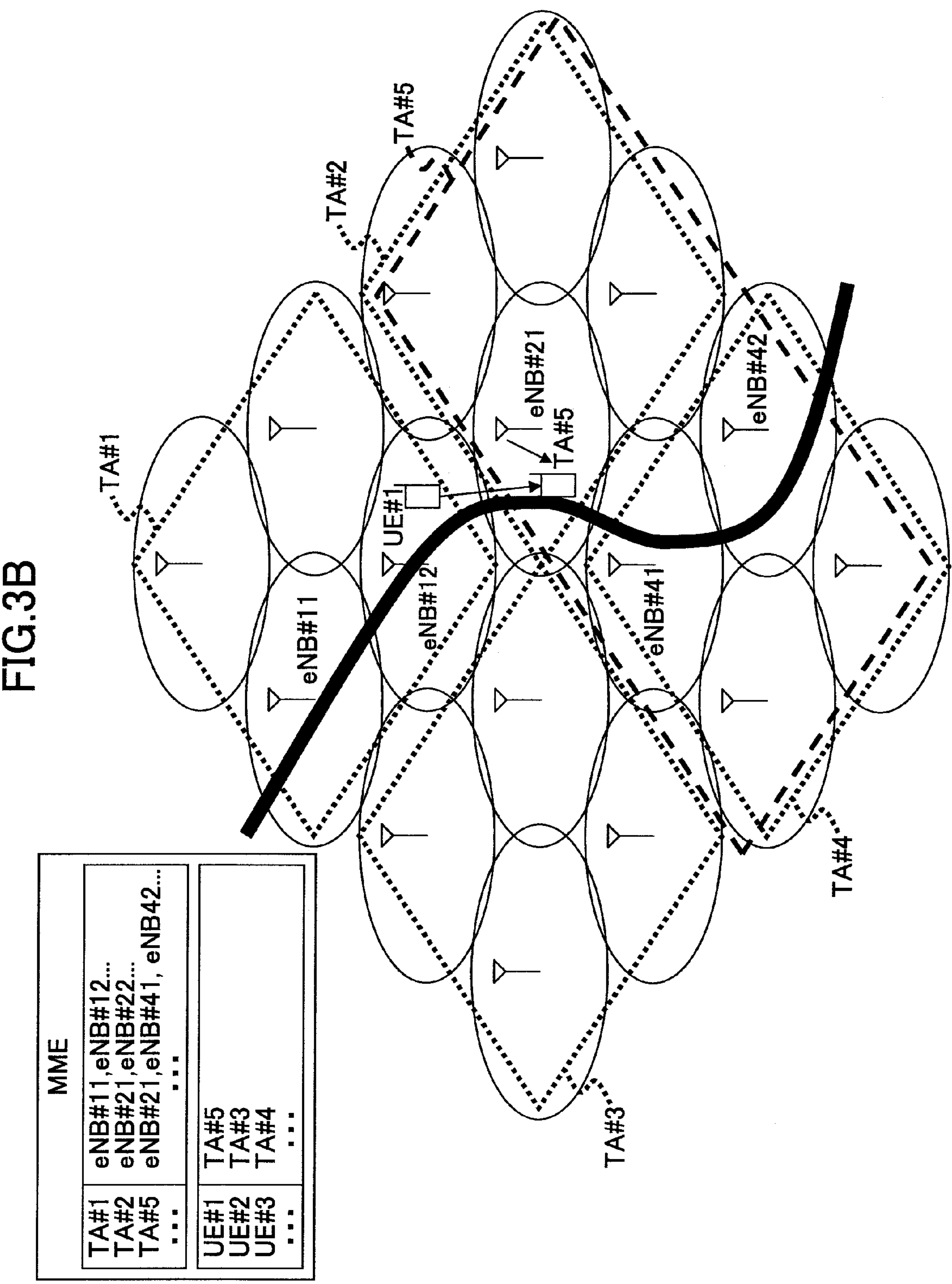
FIG. 3B shows an example of tracking areas assigned to user terminals in accordance with the first embodiment of the present invention (in the case of overlapping location registration).

With reference to FIGS. 2, 3A, and 3B, a method in which a tracking area management apparatus (MME) efficiently assigns tracking areas to user terminals (UE) in accordance with a first embodiment is described below. FIG. 2 shows a sequence diagram of a tracking area assigning method in accordance with the first embodiment of the present invention. FIG. 3A shows an example of tracking areas assigned to user terminals in accordance with the first embodiment of the present invention (in the case of multi-location registration). FIG. 3B shows an example of tracking areas assigned to user terminals in accordance with the first embodiment of the present invention (in the case of overlapping location registration).

A user terminal (UE) stores in order, as a cell ID list, cell IDs of cells where the user terminal has performed cell selection during standby status (S101). The user terminal may not store an overlapping cell ID. In the example of FIG. 3A, when the user terminal UE#1 moves along the route of eNB#11->eNB#12 within the tracking area TA#1, the user terminal UE#1 stores the cell IDs eNB#11 and eNB#12 in the cell ID list. When the user terminal UE#1 moves from the cell eNB#12 to the cell eNB#21, the user terminal further stores, in the cell ID list, the cell ID eNB#21 of the base station where the user terminal has performed cell selection. Since the user terminal UE#1 knows that the TA_ID has changed from TA#1 to TA#2 by receiving broadcast information from the base station eNB#21, the user terminal requests tracking area update (TAU) (S103). The user terminal transmits a request for tracking area update and the cell ID list (eNB#11, eNB#12, eNB#21) to the base station eNB#21 (S105). The base station eNB#21 receives these data and reports them to the tracking area management apparatus (MME) (S107).

The tracking area management apparatus (MME) stores in advance in a pattern storage unit information that many user terminals move along the route of eNB#11->eNB#12->eNB#21->eNB#41->eNB#42. The pattern storage unit may store a correspondence between a movement pattern (eNB#11->eNB#12->eNB#21) and a TA_ID list (TA#2, TA#4). For example the pattern storage unit stores a movement pattern of a user who moves by rail or on a highway. Alternatively, the pattern storage unit may stores in the pattern storage unit information that many user terminals move along such a route based on traces reported by user terminals.

When the tracking area management apparatus (MME) receives the request for tracking area update and the cell ID list (eNB#11, eNB#12, eNB#21), the tracking area management apparatus compares the trace of the cell IDs with the patterns stored in the pattern storage unit. For example, when the pattern of eNB#11->eNB#12->eNB#21 is stored in the pattern storage unit, it is likely that the user terminal moves from the cell eNB#21 to the cells eNB#41 and eNB#42 (eNB#41->eNB#42) within the tracking area TA#4. Accordingly, the MME assigns to the user terminal both the tracking area TA#2 to which the cell eNB#21 belongs and the tracking area TA#4 to which the cells eNB#41 and eNB#42 belong as TA_IDs (S109). The tracking area management apparatus (MME) transmits an acceptance of tracking area update (TAU_accept) and the TA_ID list (TA#2, TA#4) to the base station (S111). The base station receives these data and transmits them to the user terminal (S113), thereby completing the tracking area update of the user terminal (S115).

Since the user terminal UE#1 is assigned tracking areas TA#2 and TA#4, the user terminal need not perform tracking area update (TAU) upon moving from the cell eNB#21 to the cell eNB#41. According to the first embodiment, it is possible to dynamically assign tracking areas to user terminals with flexibility.

For example, when many user terminals are moving by rail or on a highway, reports from the user terminals may overload the tracking area management apparatus. In order to reduce the workload of the tracking area management apparatus, the base station (eNB) may specify the need for reporting (whether the user terminal needs to report the cell ID list), the maximum number in the cell ID list (the maximum number of cell IDs in the cell ID list), a time period during which the user terminal should report cell IDs, a reporting rate, or the like on the broadcast channel (BCH) or the dedicated channel (DCH).

In FIG. 2, the user terminal reports the cell ID list to the MME upon performing tracking area update (TAU). Alternatively, the user terminal may report the cell ID list to the MME upon placing or receiving a call or terminating a call. In FIG. 2, the user terminal reports the cell ID list as a trace along which the user terminal has moved. Alternatively, the user terminal may report scrambling code IDs of the base stations. The scrambling code ID of the base station is detected during cell selection by correlation processing with a predetermined number of scrambling code IDs which are determined in the system.

With reference to FIGS. 2 and 3A, the method has been described in the case of multi-location registration where multiple tracking areas are assigned to the user terminal. Alternatively, the method is applicable in a similar manner to overlapping location registration where the base station belongs to multiple tracking areas. It should be noted that the method is also applicable in a similar manner to the combination of multi-location registration and overlapping location registration. According to overlapping location registration, the user terminal belongs to a single tracking area, whereas the base station can belong to multiple tracing areas. For example, as shown in FIG. 3B, it is possible to individually define tracking areas TA#2 and TA#4 as well as to collectively define these tracking areas as a tracking area TA#5. In this case, the tracking area management apparatus (MME) receives from the user terminal the cell ID list (eNB#11, eNB#12, eNB#21) which is stored by the user terminal during the standby status, and then compares the cell ID list with a prestored pattern (eNB#11->eNB#12->eNB#21). If there is a pattern match, the tracking area management apparatus assigns the tracking area (TA#5) prestored in the pattern storage unit to the user terminal. In this manner, the user terminal need not perform tracking area update (TAU) upon moving from the cell eNB#21 to the cell eNB#41.

First Embodiment

A Flowchart of a Trace Reporting Method in a User Terminal

Figure 4A:
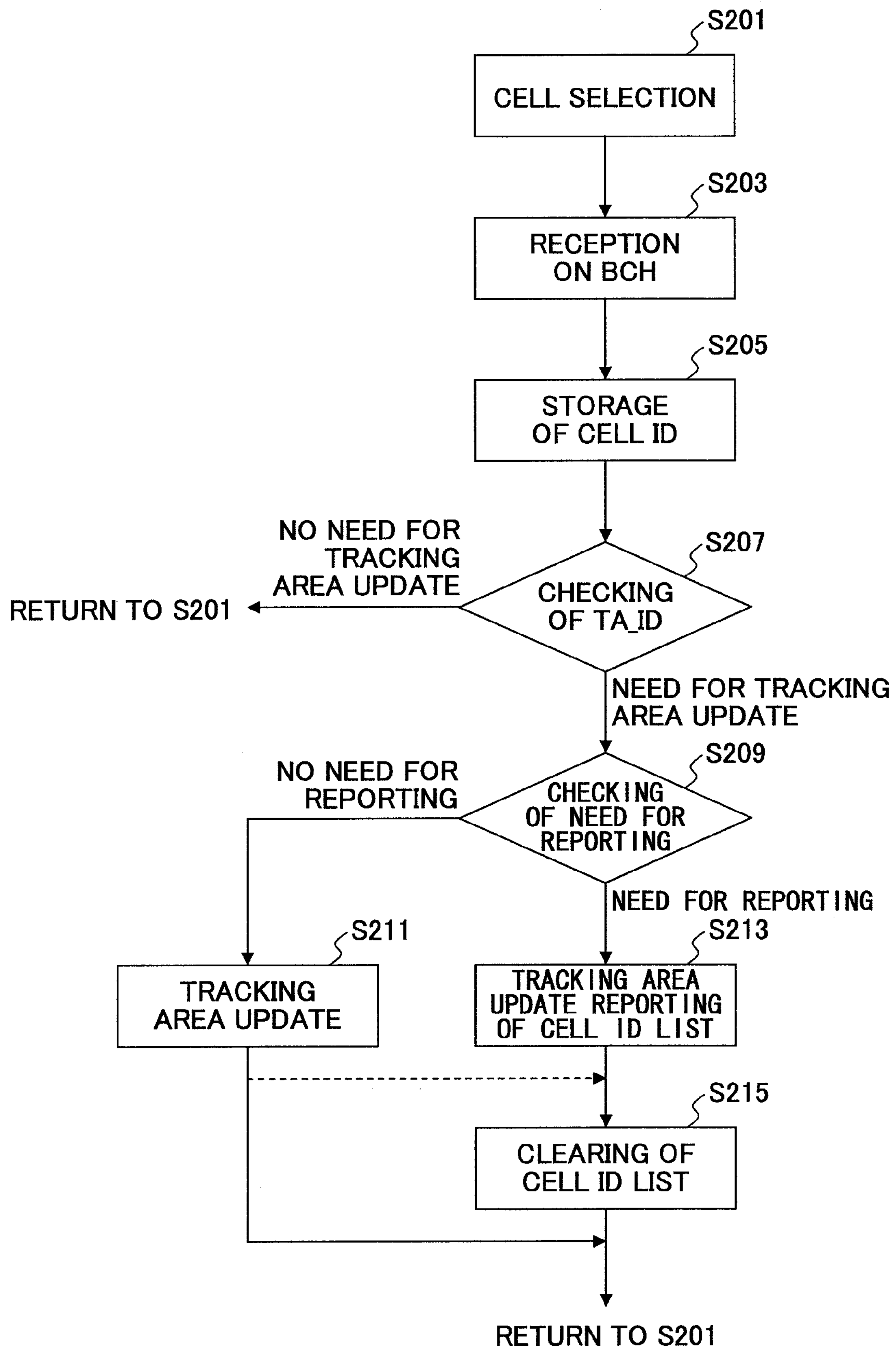
FIG. 4A shows a flowchart of a method in which a user terminal reports a trace upon performing tracking area update.
Figure 4B:
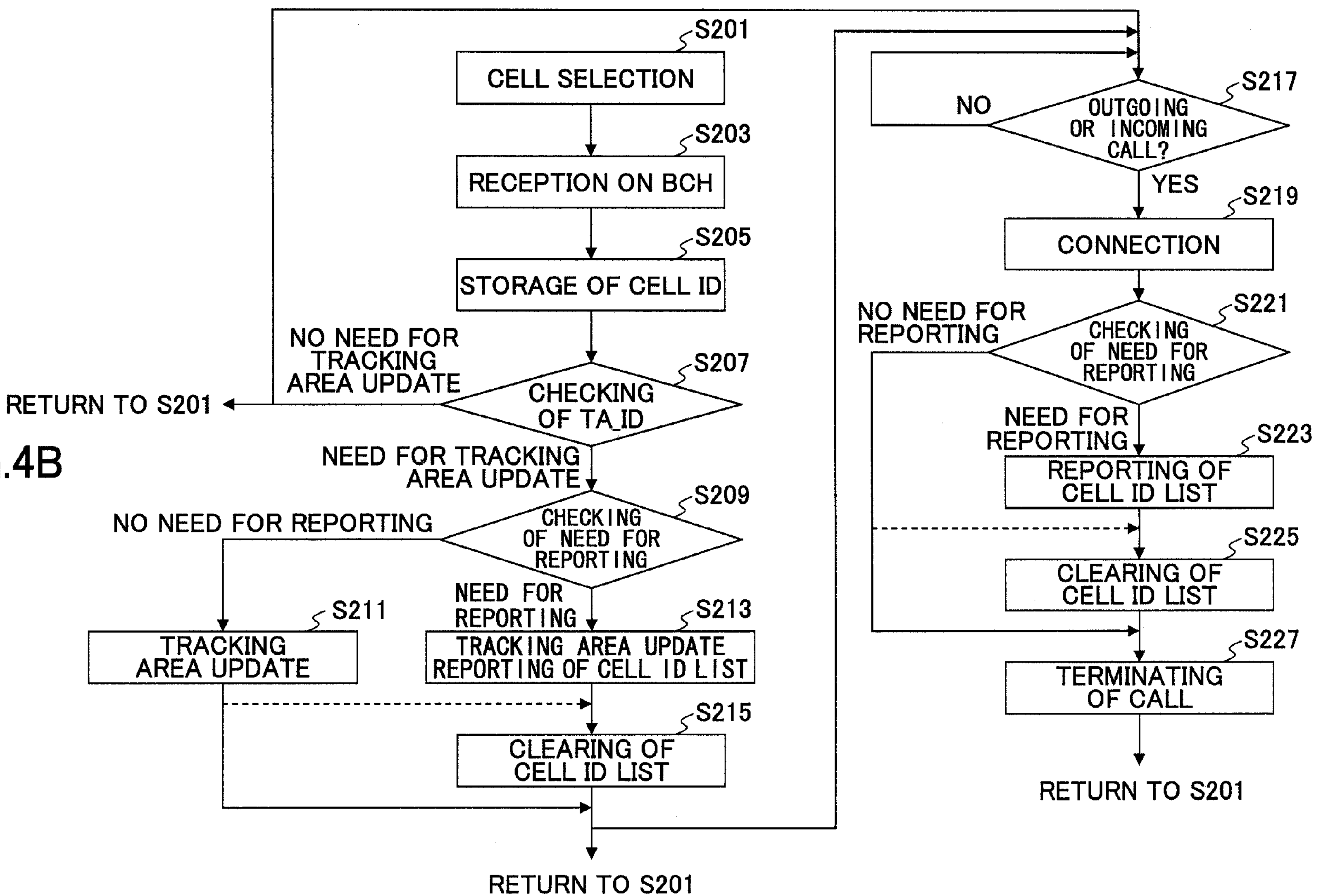
FIG. 4B shows a flowchart of a method in which a user terminal reports a trace upon performing tracking area update and upon placing or receiving a call.

With reference to FIGS. 4A and 4B, a method in which a user terminal reports a trace along which the user terminal has moved is described below. FIG. 4A shows a flowchart of a method in which the user terminal reports the trace upon performing tracking area update (TAU).

The user terminal continuously performs cell search during the standby status and selects a cell with a better propagation level (S201). Then, the user terminal receives broadcast information from the selected cell on the broadcast channel (BCH) (S203). The broadcast information received on the broadcast channel includes the cell ID of the selected cell and the TA_ID of the tracking area to which the selected cell belongs. On the broadcast channel, the user terminal may further receive information about whether the user terminal needs to report the cell ID list.

The user terminal stores the cell ID in order in the cell ID list (S205). The user terminal may store the time of day at which the user terminal has performed cell selection and associate the time of day with the cell ID. Then, the user terminal determines whether the TA_ID is the same as the current TA_ID (S207). If the TA_ID is the same as the current TA_ID, the user terminal need not perform tracking area update and the user terminal returns to cell selection (S201). Otherwise, the user terminal needs to perform tracking area update. When the user terminal receives on the broadcast channel information about whether the user terminal needs to report the cell ID list, the user terminal checks this information (S209). If the user terminal need not report the cell ID list, the user terminal performs tracking area update (TAU) with the tracking area management apparatus (S211). After the tracking area update, the user terminal may clear the cell ID list (S215) or may return to cell selection (S201). If the user terminal needs to report the cell ID list, the user terminal performs tracking area update and reports the cell ID list to the tracking area management apparatus (S213). The reported cell ID list is cleared (S215) and the user terminal returns to cell selection (S201).

In accordance with this flowchart, the user terminal can report the trace to the tracking area management apparatus upon performing tracking area update.

FIG. 4B shows a flowchart in which the user terminal reports the trace upon performing tracking area update and upon placing or receiving a call.

Steps regarding tracking area update (S201 through S215) are the same as the steps described with reference to FIG. 4A and their discussion is thus omitted. After it is determined that the user terminal need not perform tracking area update (S207) or after the user terminal performs tracking area update (S211 or S213), the user terminal performs cell selection and determines whether the user terminal is placing or receiving a call (whether there is an outgoing or incoming call) (S217). If the user terminal is placing or receiving a call, the user terminal connects to the base station (S219). When the user terminal receives on the broadcast channel information about whether the user terminal needs to report the cell ID list, the user terminal checks this information (S221). If the user terminal need not report the cell ID list, the user terminal communicates with the base station. After communication, the user terminal may clear the cell ID list (S225) or terminate the call (S227). If the user terminal needs to report the cell ID list, the user terminal reports the cell ID list to the tracking area management apparatus (S223). The reported cell ID list is cleared (S225) and the call is terminated (S227).

When the user terminal reports the cell ID list to the tracking area management apparatus upon terminating a call, step S227 of FIG. 4B may be performed between steps S219 and S221.

First Embodiment

Figure 5:
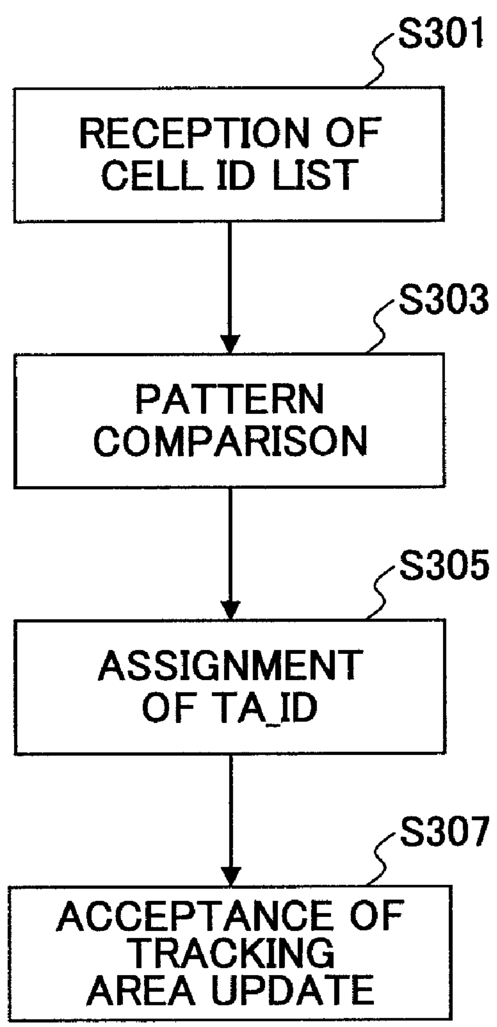
FIG. 5 shows a flowchart of a method in which a tracking area management apparatus assigns tracking areas to user terminals.

A Flowchart of a Tracking Area Assigning Method in a Tracking Area Management Apparatus With reference to FIG. 5, a method in which a tracking area management apparatus assigns tracking areas to user terminals is described below. FIG. 5 shows a flowchart in which the tracking area management apparatus assigns tracking areas to user terminals.

The tracking area management apparatus stores in advance movement patterns such as movement by rail or on a highway in the pattern storage unit. When the tracking area management apparatus receives the cell ID list from the user terminal via the base station upon the user terminals performing tracking area update (S301), the tracking area management apparatus compares the cell ID list with the patterns prestored in the pattern storage unit (S303). If the cell ID list matches one of the patterns, the tracking area management apparatus assigns to the user terminal a TA_ID (or a TA_ID list) which is determined according to the pattern (S305). The TA_ID (or the TA_ID list) is transmitted to the user terminal along with the acceptance of the tracking area update (S307).

First Embodiment

A Structure of a User Terminal (UE)

Figure 6:
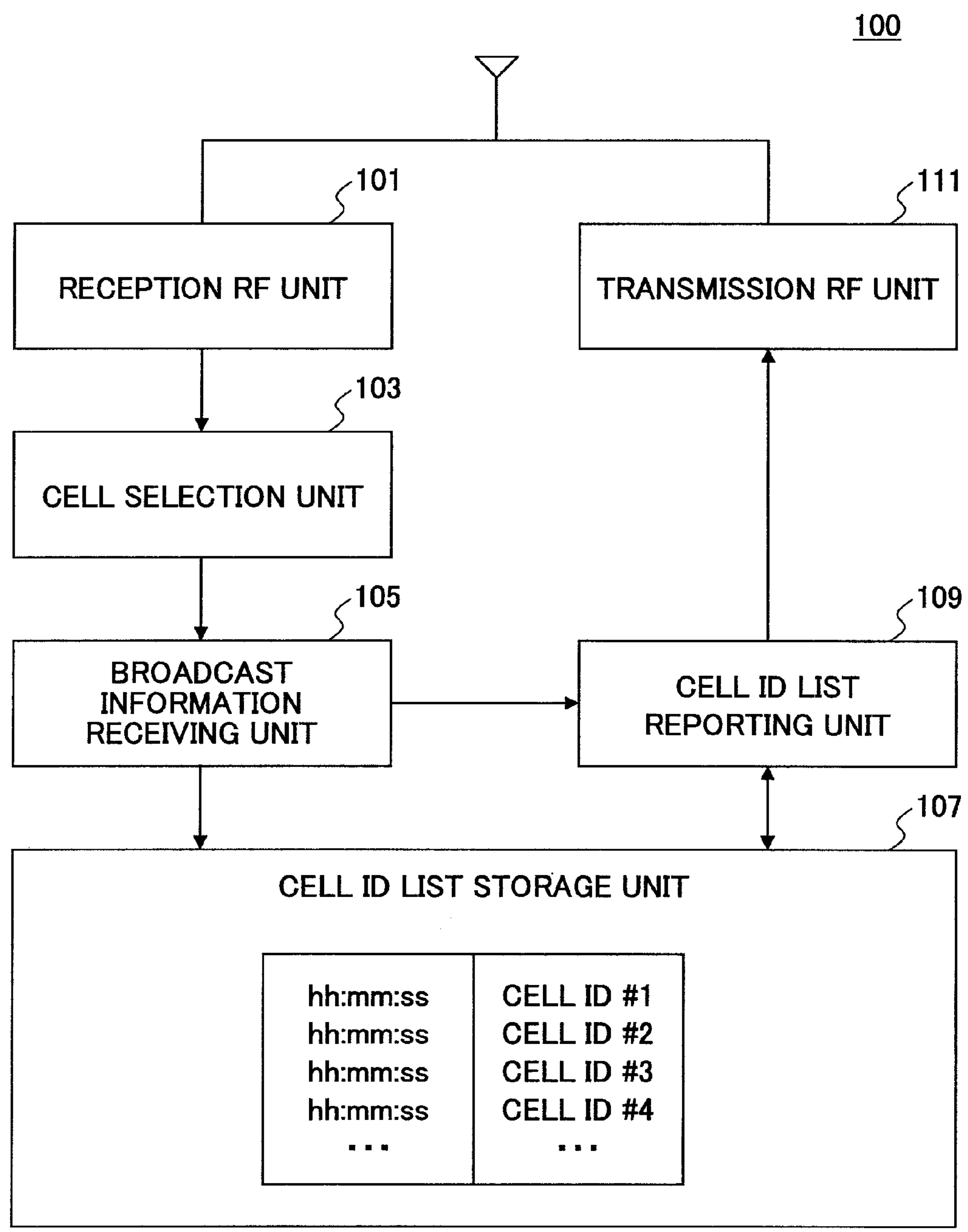
FIG. 6 shows a block diagram of a user terminal in accordance with the first embodiment of the present invention.

With reference to FIG. 6, a structure of a user terminal is described below. FIG. 6 shows a block diagram of a user terminal 100 in accordance with the first embodiment of the present invention. The user terminal 100 includes a reception RF unit 101, a cell selection unit 103, a broadcast information receiving unit 105, a cell ID list storage unit (identifier storage unit) 107, a cell ID list reporting unit (trace reporting unit) 109, and a transmission RF unit 111.

The reception RF unit 101 receives signals from the base stations. The cell selection unit 103 selects a cell with a better propagation level of the received signals. The cell selection unit 103 may perform correlation processing with a predetermined number of scrambling code IDs which are determined in advance in the system, and then identify a scrambling code ID which is used in the base station whose cell is selected by the cell selection unit 103.

The broadcast information receiving unit 105 receives broadcast information from the base station. The broadcast information includes the cell ID of the selected cell and the TA_ID of the tracking area to which the selected cell belongs. The broadcast information may also include a parameter such as information about whether the user terminal needs to report the cell ID list, the maximum number in the cell ID list (the maximum number of cell IDs in the cell ID list) to be reported, a time period during which the user terminal should report cell IDs (last few hours, etc.), or a reporting rate. For example, the reporting rate may be to report once out of N times or to report when modulo arithmetic using the user terminal ID (C-RNTI (Cell specific Radio Network Temporary ID), TMSI (Temporary Mobile Subscriber ID), IMSI (International Mobile Subscriber ID), etc.) is equal to a predetermined value. The parameter may be received on the dedicated control channel (DCH) (not shown).

The cell ID list storage unit 107 stores in order, as a cell ID list, cell IDs of cells where the user terminal has performed cell selection. Optionally, the cell ID list storage unit 107 may store the time of day at which the user terminal has performed cell selection and associate the time of day with the cell ID. Storing the time of day in the cell ID list storage unit 107 allows the tracking area management apparatus to accurately make the pattern comparison. When the broadcast information receiving unit 105 receives a requirement such as the number of cell IDs in the cell ID list or the time period during which the user terminal 100 should transmit cell IDs, the cell ID list storage unit 107 assembles the cell ID list which satisfies the requirement. Overlapping cell IDs may not be stored in the cell ID list.

It should be noted that the cell ID list storage unit 107 corresponds to an identifier storage unit, which may store scrambling code IDs rather than cell IDs.

The cell ID list reporting unit 109 reports to the tracking area management apparatus the cell ID list stored in the cell ID list storage unit 107 upon communication with the base station (upon performing tracking area update, upon placing a call, upon receiving a call, or upon terminating a call). This report is transmitted from the transmission RF unit 111 to the base station, and then transmitted from the base station to the tracking area management apparatus. When the broadcast information receiving unit 105 receives a requirement such as information about whether the user terminal 100 needs to report the cell ID list or the reporting rate, the cell ID list reporting unit 109 reports the cell ID list when the requirement is satisfied. The cell ID list reporting unit 109 deletes the list stored in the cell ID list storage unit 107 upon completion of reporting the cell ID list.

It should be noted that the cell ID list reporting unit 109 corresponds to a trace reporting unit, which may report a scrambling code ID list rather than the cell ID list to the tracking area management apparatus.

First Embodiment

A Structure of a Base Station (eNB)

Figure 7:
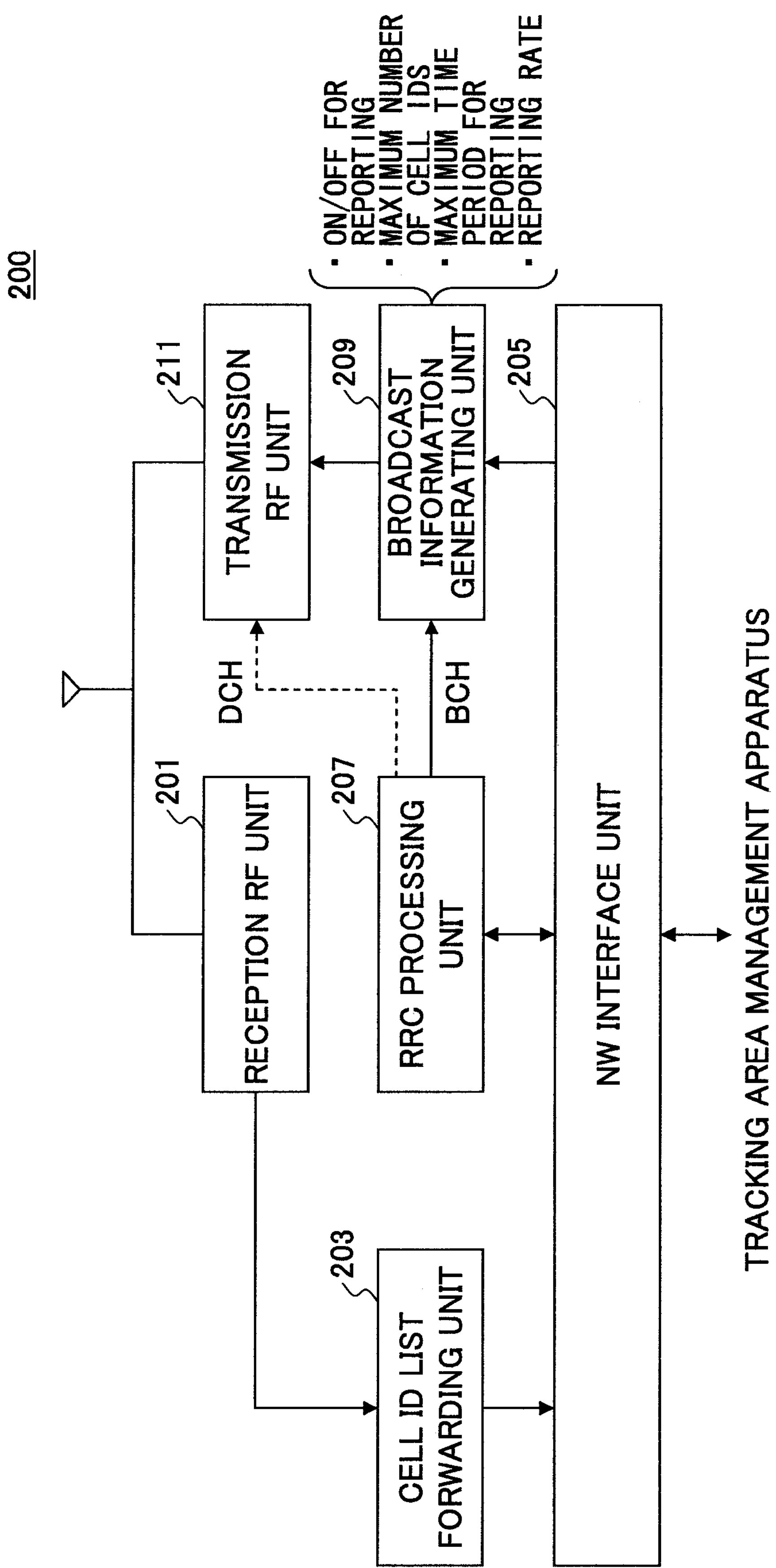
FIG. 7 shows a block diagram of a base station in accordance with the first embodiment of the present invention.

With reference to FIG. 7, a structure of a base station is described below. FIG. 7 shows a block diagram of a base station 200 in accordance with the first embodiment of the present invention. The base station 200 includes a reception RF unit 201, a cell ID list forwarding unit 203, a NW (network) interface unit 205, an RRC (radio resource control) processing unit 207, a broadcast information generating unit 209, and a transmission RF unit 211.

The reception RF unit 201 receives signals from the user terminal 100. The signals include the cell ID list to be reported to the tracking area management apparatus. The cell ID list forwarding unit 203 forwards the cell ID list received from the user terminal 100 to the tracking area management apparatus via the NW interface unit 205.

It should be noted that the cell ID list forwarding unit 203 corresponds to an identifier forwarding unit, which may forward a scrambling code ID list rather than the cell ID list to the tracking area management apparatus.

The RRC processing unit 207 performs RRC (radio resource control) processing on the Layer 3 and manages control information and broadcast information to be transmitted to the user terminal. When the base station 200 notifies, as broadcast information, the user terminal 100 of a parameter such as information about whether the user terminal 100 needs to report the cell ID list, the maximum number in the cell ID list (the maximum number of cell IDs in the cell ID list) to be reported, a time period during which the user terminal 100 should report cell IDs (last few hours, etc.), or a reporting rate, the RRC processing unit 207 controls the broadcast information generating unit 209 to generate the broadcast information. The broadcast information generating unit 209 generates the parameter as the broadcast information. The broadcast information is transmitted from the transmission RF unit 211 to the user terminal 100. When the parameter is transmitted as dedicated control information, the RRC processing unit 207 generates the dedicated control information and controls the transmission RF unit 211 to transmit the dedicated control information to the user terminal 100.

It should be noted that the combination of the RRC processing unit 207 and the broadcast information generating unit 209 corresponds to a report parameter notifying unit, which generates various parameters used for the user terminal 100 to report the cell ID list to the tracking area management apparatus.

First Embodiment

A Structure of a Tracking Area Management Apparatus (MME)

Figure 8:
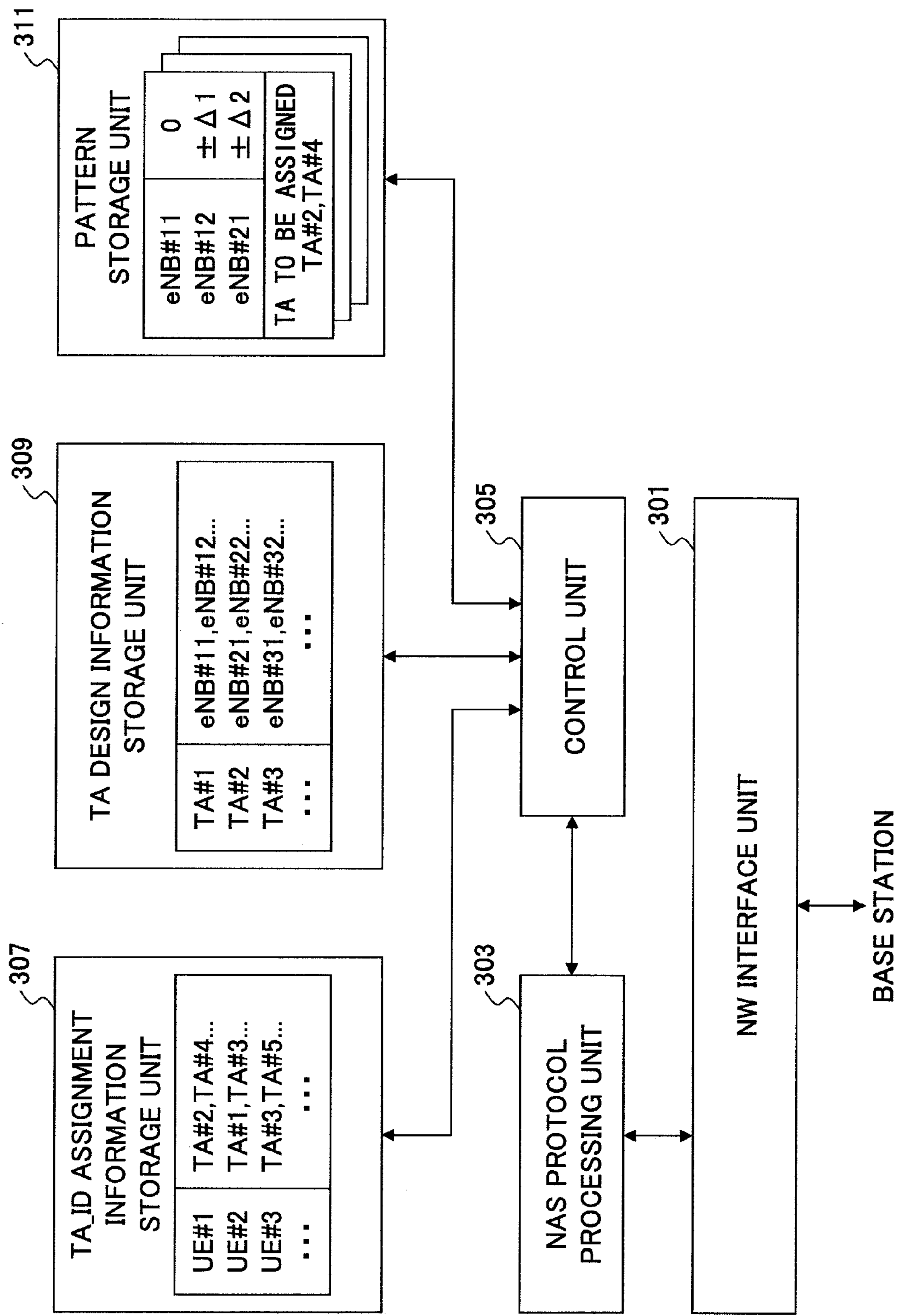
FIG. 8 shows a block diagram of a tracking area management apparatus in accordance with the first embodiment of the present invention.

With reference to FIG. 8, a structure of a tracking area management apparatus is described below. FIG. 8 shows a block diagram of a tracking area management apparatus 300 in accordance with the first embodiment of the present invention. The tracking area management apparatus 300 includes a NW interface unit 301, a NAS (non-access stratum) protocol processing unit 303, a control unit 305, a TA_ID assignment information storage unit 307, a TA design information storage unit 309, and a pattern storage unit 311.

The NW interface unit 301 receives signals from the base station 200. The signals include the cell ID list reported from the user terminal 100. The NAS protocol processing unit 303 manages tracking area update of the user terminal 100. When the NAS protocol processing unit 303 receives the request for tracking area update and the cell ID list from the user terminal 100, the NAS protocol processing unit 303 supplies the cell ID list to the control unit 305.

The control unit 305 compares the cell ID list with the patterns stored in the pattern storage unit 311 and determines whether there is a match. When the times of day at which the user terminal 100 has performed cell selection are reported along with the cell ID list, the control unit 305 compares the cell ID list with the prestored patterns and also determines whether the time interval when the user terminal has moved from one cell to another cell falls within a predetermined time frame. For example, when the cell ID list matches one of the patterns (eNB#11->eNB#12->eNB#21) stored in the pattern storage unit, the control unit 305 determines whether the time difference between cell selection for the cell eNB#11 and cell selection for the cell eNB#12 is within a time frame +/−Δ1 and whether the time difference between cell selection for the cell eNB#12 and cell selection for the cell eNB#21 is within a time frame +/−Δ2. A more preferred method of determining a pattern match is described below. If there is a pattern match, the control unit 305 assigns one or more predetermined TA_IDs (TA#2, TA#4) to the user terminal 100. Otherwise, the control unit 305 may check the TA design information storage unit 309 and assign the TA_ID for the cell selected by the user terminal 100. Alternatively, the control unit 305 may not assign the TA_ID, since the user terminal 100 knows the TA_ID upon cell selection. The TA_ID assigned to the user terminal 100 is stored in the TA_ID assignment information storage unit 307.

When the control unit 305 determines the TA_ID list (or TA_ID) assigned to the user terminal 100, the NAS protocol processing unit 303 receives the TA_ID list (or TA_ID) from the control unit 305 and transmits the TA_ID list (or TA_ID) and the acceptance of the tracking area update to the user terminal 100.

It should be noted that the NAS protocol processing unit 303 corresponds to an identifier receiving unit, which may receive a scrambling code ID list rather than the cell ID list.

In the case where the times of day at which the user terminal 100 has performed cell selection are reported along with the cell ID list, a more preferred method of determining a pattern match is described below. It is assumed that the pattern storage unit 311 stores the cell ID list (eNB#11->eNB#12->eNB#21->eNB#41->eNB#42) as a cell selection pattern. It is also assumed that the pattern storage unit 311 further stores the timing list (T0->T1->T2->T3->T4) as a relative timing pattern for selecting the corresponding base stations 200. When the user terminal 100 reports the cell ID list (eNB#11->eNB#12->eNB#21->eNB#41->eNB#42) as a trace for cell selection and the times of day (t0->t1->t2->t3->t4) as timing for selecting these cells, the control unit 305 calculates time differences $\Delta T1 = T1 - T0$, $\Delta T2 = T2 - T1$, $\Delta T3 = T3 - T2$, and $\Delta T4 = T4 - T3$ as well as time differences $\Delta t1 = t1 - t0$, $\Delta t2 = t2 - t1$, $\Delta t3 = t3 - t2$, and $\Delta t4 = t4 - t3$. Then, the control unit 305 calculates a scalar (v) which minimizes $\epsilon = |v^* \Delta T - \Delta t|$ for vectors $\Delta T = (\Delta T1, \Delta T2, \Delta T3, \Delta T4)$ and $\Delta t = (\Delta t1, \Delta t2, \Delta t3, \Delta t4)$ by means of an MMSE (minimum mean square error) method. When the result $\epsilon$ is below a predetermined threshold E, the control unit 305 determines that there is a pattern match. Using this calculation, it is possible to support a user terminal (UE) 100 which moves along the same route with a different speed.

As will be understood from this embodiment, the pattern storage unit 311 may store the time differences ΔT1 through ΔT4 rather than the timing list T0 through T4. Similarly, the user terminal 100 may report the time differences Δt1 through Δt4 rather than the times of day t1 through t4. When the trace reported from the user terminal 100 matches only a portion of the pattern (when the user terminal 100 reports only the cell ID list (eNB#11->eNB#12->eNB#21) and the times of day (t0->t1->t2), for example), the same method of determining a pattern match only with the time differences Δt1 and Δt2 can be used based on the time differences ΔT1 and ΔT2. In addition, when there is the pattern match, the stored information such as ΔT1 may be updated using the reported timing information such as Δt1. For example, the stored information may be updated by means of a forgetting factor or a sliding window. Since errors may increase as the list becomes longer, the predetermined threshold E for the result $\epsilon$ may be determined to be smaller in the case of a smaller number of elements to be compared and larger in the case of a larger number of elements to be compared. For example, the predetermined threshold E is used in the case where two elements (Δt1, Δt2)

are used for the comparison and a larger threshold 1.5*E is used in the case where three elements (Δt1, Δt2, Δt3) are used for the comparison.

The tracking area to be assigned may be variable according to the calculated scalar (v). For example, a small scalar (v) means that the user terminal (UE) 100 is moving slowly. Assigning a large tracking area in this case may wastefully increase the number of paging signals. It is preferable to assign a small tracking area to the user terminal 100 in this case. On the other hand, a larger scalar (v) means that the user terminal (UE) 100 is moving fast. It is preferable to assign a large tracking area to the user terminal 100 in this case. In this manner, for the purpose of optimizing the tracking area, the tracking area to be assigned may be controlled according to the scalar (v), even though there is a match with the same pattern. For this purpose, the pattern storage unit 311 may store the TA_ID list of the tracking areas to be assigned according to the range of the scalar (v).

Second Embodiment

Efficiently Designing Tracking Areas

Figure 9:
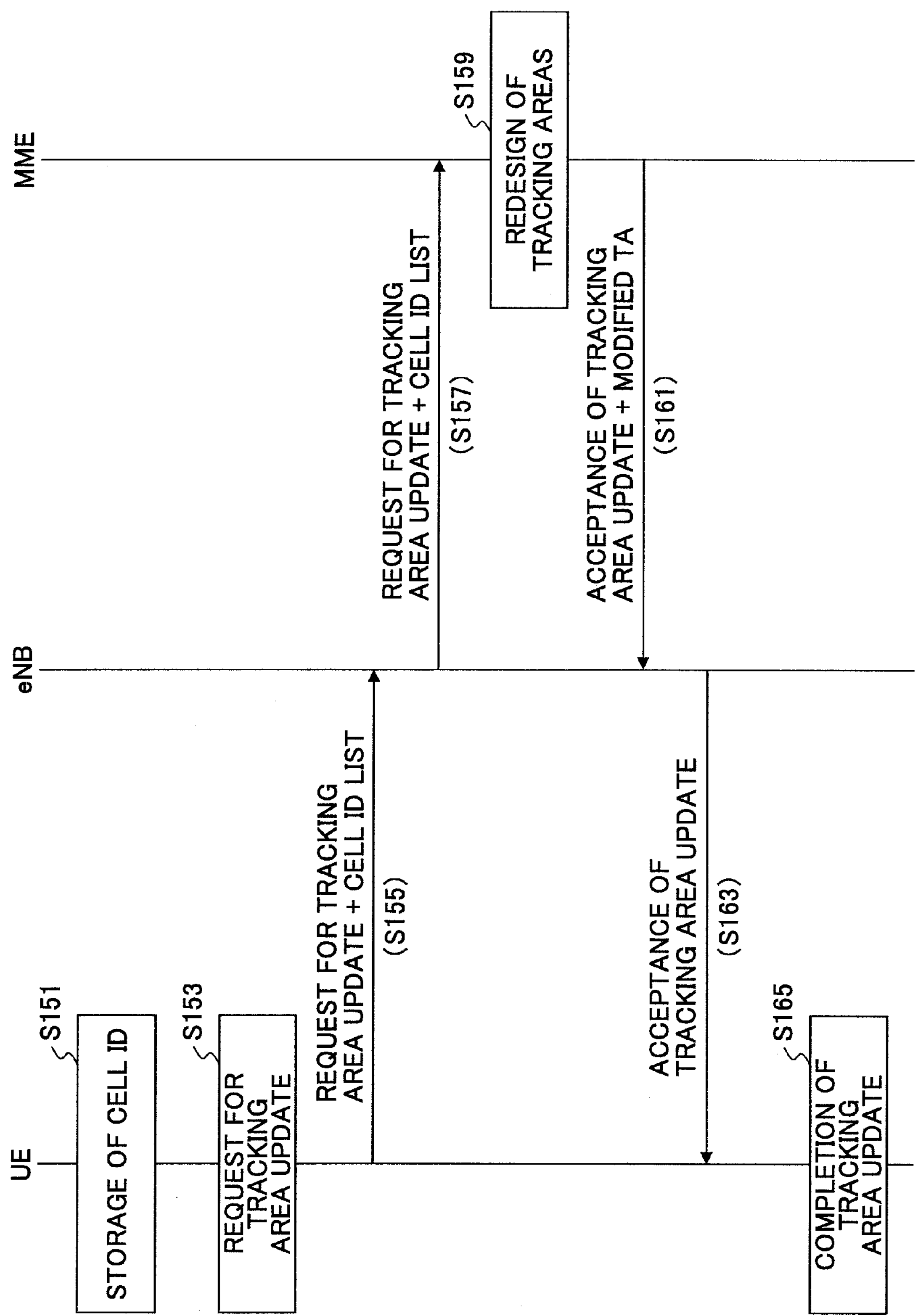
FIG. 9 shows a sequence diagram of a tracking area designing method in accordance with a second embodiment of the present invention.
Figure 10:
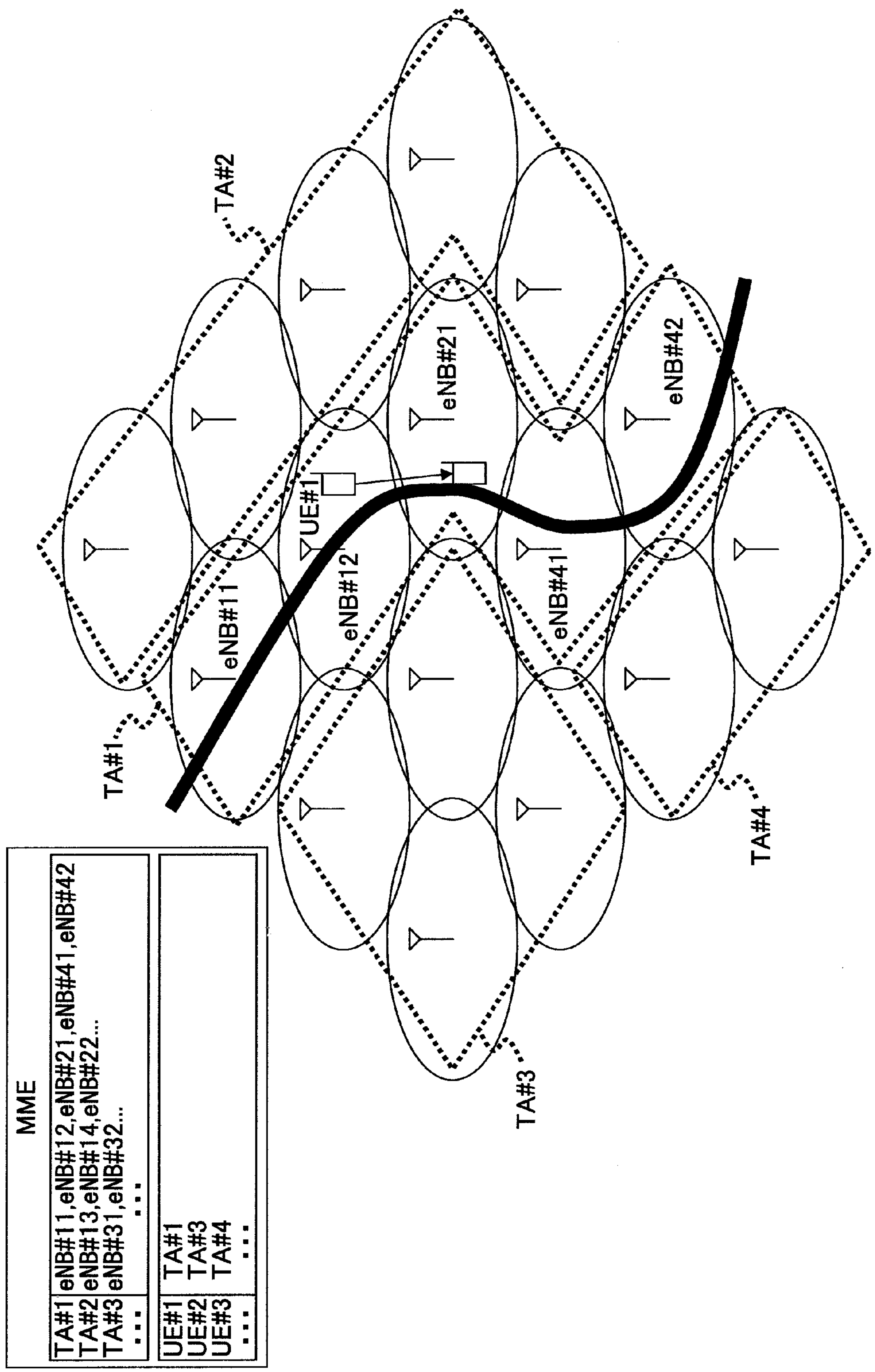
FIG. 10 shows an example of tracking areas which are optimized in accordance with the second embodiment of the present invention.

With reference to FIGS. 9 and 10, a method in which a tracking area management apparatus (MME) efficiently designs tracking areas in accordance with a second embodiment is described below. FIG. 9 shows a sequence diagram of a tracking area designing method in accordance with the second embodiment of the present invention. FIG. 10 shows an example of tracking areas which are optimized in accordance with the second embodiment of the present invention.

Steps S151 through S157 correspond to steps S101 through S107 in FIG. 2 and their discussion is thus omitted. When the tracking area management apparatus (MME) receives the request for tracking area update and the cell ID list (eNB#11, eNB#12, eNB#21) (S157), the tracking area management apparatus stores the trace of cell IDs in the pattern storage unit. When the same trace is consequently stored more than a predetermined number of times in the pattern storage unit, it is preferable to redesign tracking areas according to this trace. In this case, when the cell ID list (eNB#11, eNB#12, eNB#21) is stored more than the predetermined number of times, the MME redesigns tracking areas such that these base stations belong to the same tracking area (S159). For example, the MME may determine that the tracking area TA#1 consists of the base stations eNB#11, eNB#12, and eNB#21. Alternatively, the MME may add the base station eNB#21 to the current tracking area TA#1. When tracking areas are redesigned, the tracking area management apparatus (MME) notifies related base stations (eNBs) of the redesigned tracking areas, modifies the tracking areas, and transmits an acceptance of tracking area update to the base station (S161). The base station modifies the TA_ID and transmits the acceptance of tracking area update to the user terminal (S163), thereby completing tracking area update of the user terminal (S165).

It should be noted that redesign of tracking areas (S159) need not be performed every time the tracking area management apparatus receives the cell ID list from the user terminal but may be collectively performed at a certain time. By repeating these steps, the areas such as a railroad or a highway where user terminals frequently move will belong to the same tracking area, as shown in FIG. 10. In this manner, tracking areas are optimized. According to the second embodiment, it is possible to dynamically design tracking areas with flexibility.

As is the case with the first embodiment, the method in accordance with the second embodiment is applicable to both multi-location registration and overlapping location registration. In addition, the method is also applicable to the combination of multi-location registration and overlapping location registration.

Second Embodiment

A Flowchart of a Tracking Area Designing Method in a Tracking Area Management Apparatus A trace reporting method in a user terminal in accordance with the second embodiment is the same as the trace reporting method in accordance with the first embodiment.

Figure 11:
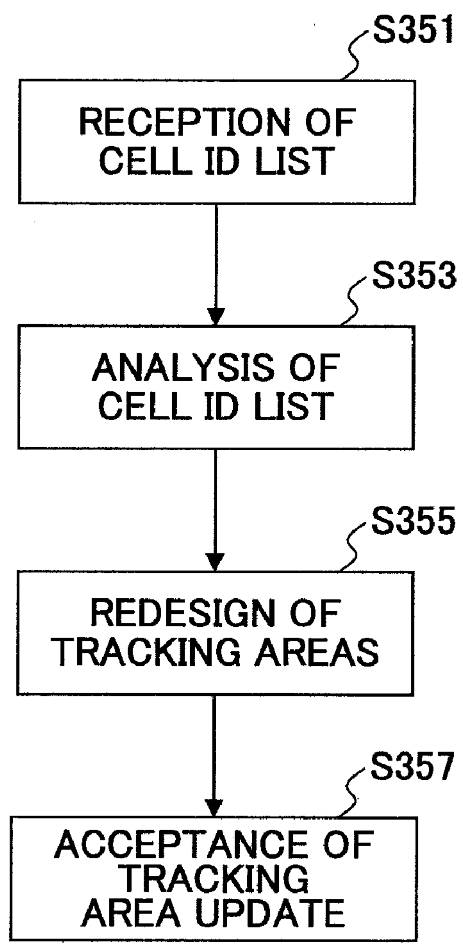
FIG. 11 shows a flowchart of a method in which a tracking area management apparatus redesigns tracking areas.

With reference to FIG. 11, a method in which a tracking area management apparatus redesigns tracking areas is described below. FIG. 11 shows a flowchart in which the tracking area management apparatus redesigns tracking areas.

When the tracking area management apparatus receives the cell ID list from the user terminal via the base station upon performing tracking area update (S351), the tracking area management apparatus stores the cell ID list in the pattern storage unit and analyzes whether the same trace as the cell ID list is stored more than a predetermined number of times in the pattern storage unit (S353). If the same trace is stored more than the predetermined number of times, the tracking area management apparatus redesigns tracking areas such that cell IDs in the cell ID list belong to the same tracking area (S355). When the tracking area management apparatus modifies tracking areas, the tracking area management apparatus transmits the TA_ID to the base station and transmits the acceptance of tracking area update to the user terminal (S357).

Second Embodiment

A Structure of a Base Station (eNB)

A structure of a user terminal in accordance with the second embodiment is the same as the structure in accordance with the first embodiment.

Figure 12:
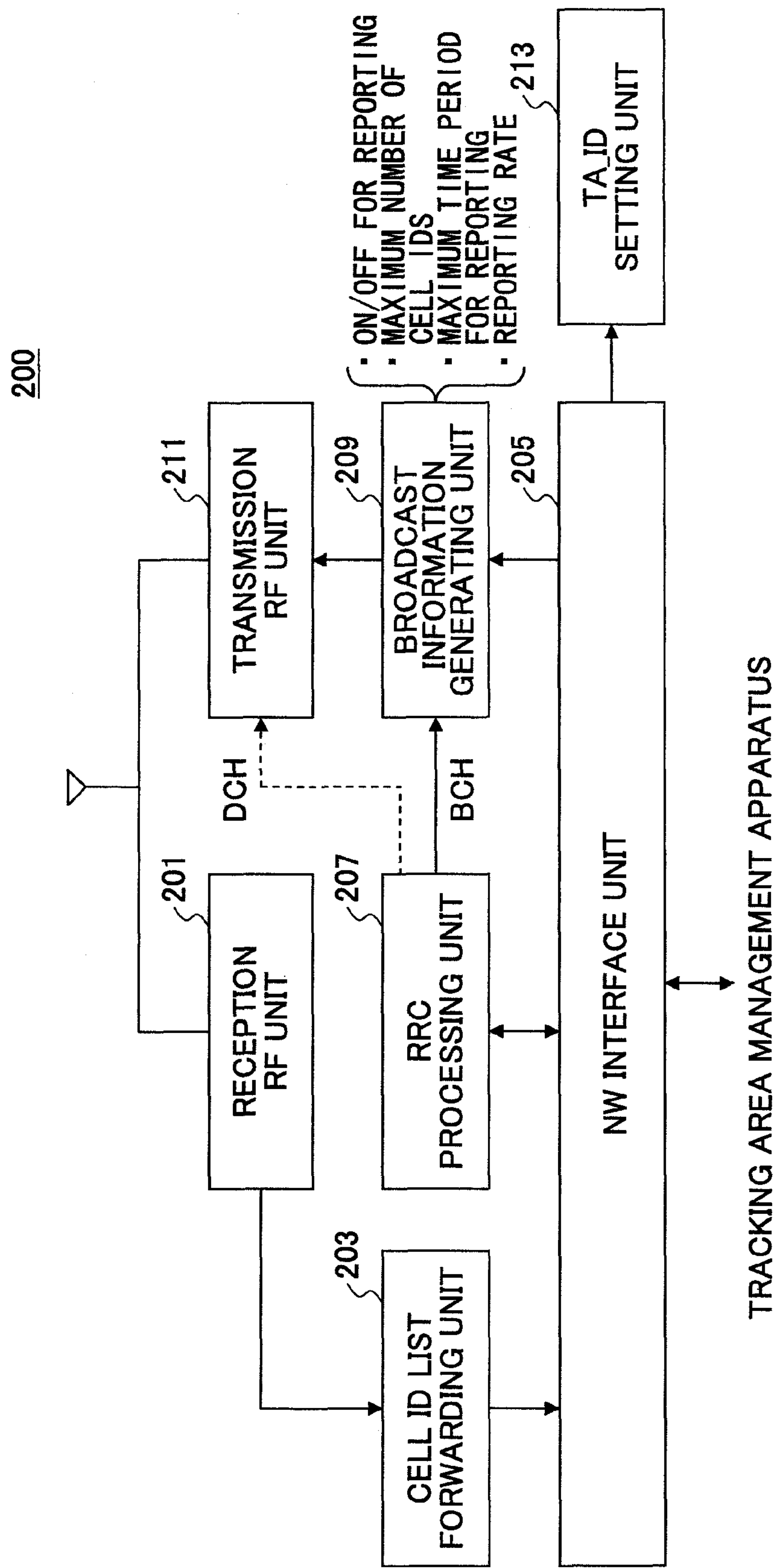
FIG. 12 shows a block diagram of a base station in accordance with the second embodiment of the present invention.

With reference to FIG. 12, a structure of a base station is described below. FIG. 12 shows a block diagram of a base station 200 in accordance with the second embodiment of the present invention. The base station 200 includes a TA_ID setting unit 213 in addition to the components shown in FIG. 7.

When the TA_ID is modified by the tracking area management apparatus, the TA_ID is supplied to the TA_ID setting unit 213 via the NW interface unit 205. The TA_ID setting unit 213 sets the TA_ID supplied from the tracking area management apparatus.

The other components are the same as those of FIG. 7.

Second Embodiment

A Structure of a Tracking Area Management Apparatus (MME)

Figure 13:
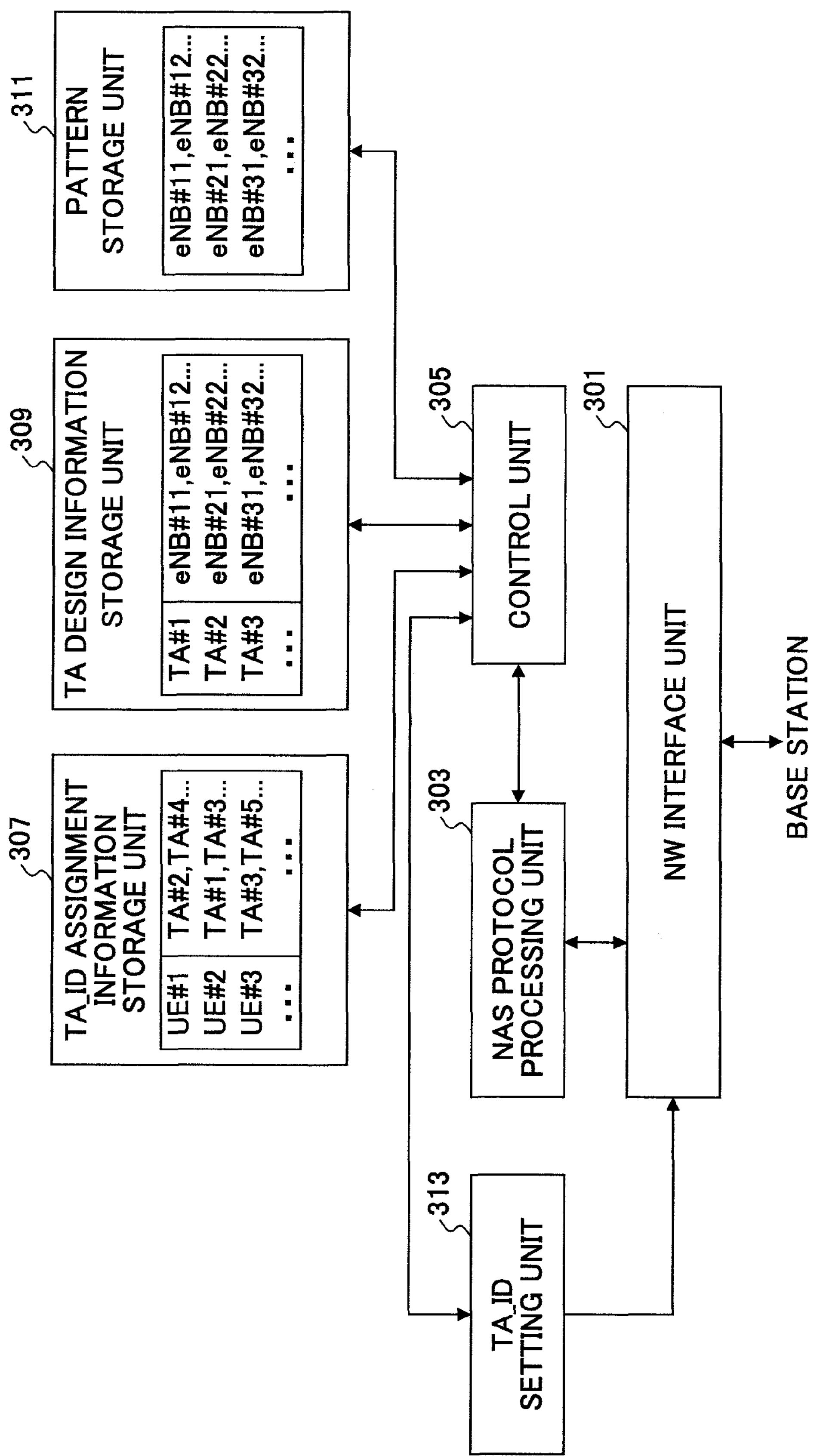
FIG. 13 shows a block diagram of a tracking area management apparatus in accordance with the second embodiment of the present invention.

With reference to FIG. 13, a structure of a tracking area management apparatus is described below. FIG. 13 shows a block diagram of a tracking area management apparatus 300 in accordance with the second embodiment of the present invention. The tracking area management apparatus 300 includes a TA_ID setting unit 313 in addition to the components shown in FIG. 8.

The NW interface unit 301 and the NAS protocol processing unit 303 are the same as those of FIG. 8.

The control unit 305 stores the received cell ID list in the pattern storage unit 311 and finds whether the same cell ID list is stored more than a predetermined number of times in the pattern storage unit 311. If the same cell ID list is not stored more than the predetermined number of times, the control unit 305 does not modify the TA_ID and transmits the acceptance of tracking area update to the user terminal via the NAS protocol processing unit 303. If the same cell ID list is stored more than the predetermined number of times, the control unit 305 redesigns tracking areas such that cells included in the cell ID list belong to the same tracking area. Then, the control unit 305 updates information in the TA design information storage unit 309. At the same time, the control unit 305 modifies the TA_ID assigned to the user terminal and stores the modified TA_ID in the TA_ID assignment information storage unit 307. The TA_ID setting unit 313 transmits the modified TA_ID to the base station. Cell ID lists which are related to the modified tracking area are deleted from the pattern storage unit 311.

The present invention is not limited to the aforementioned embodiments. The present invention may be modified within the scope of the claims.

This international patent application is based on Japanese Priority Application No. 2007-023462 filed on Feb. 1, 2007, the entire contents of which are incorporated herein by reference.

The invention claimed is:

1. A tracking area assigning method in which a user terminal reports to a tracking area management apparatus a trace along which the user terminal has moved in a mobile communication system and the tracking area management apparatus assigns a tracking area to the user terminal, comprising the steps of:

storing, by the user terminal, identifiers of base stations where the user terminal has performed cell selection and times of day at which the user terminal has performed cell selection in an identifier storage unit;

reporting, by the user terminal, to the tracking area management apparatus the identifiers and the times of day stored in the identifier storage unit upon communicating with a base station; and comparing, by the tracking area management apparatus, the reported identifiers with a prestored pattern, comparing a time difference between cell selections which is calculated from the reported times of day with a prestored time frame, and assigning the tracking area to the user terminal according to the prestored pattern, when the reported identifiers match the prestored pattern and when the time difference between cell selections is within the prestored time frame.

2. The tracking area assigning method as claimed in claim 1, further comprising the step of:

receiving, by the user terminal, from the base station at least one of the number of identifiers to be reported to the tracking area management apparatus, a time period during which the identifiers should be reported to the tracking area management apparatus, and a rate of the identifiers to be reported to the tracking area management apparatus.

3. The tracking area assigning method as claimed in claim 1, wherein:

the step of reporting comprises reporting the identifiers and the times of day upon at least one of performing tracking area update, placing a call, receiving a call, and terminating a call.

4. The tracking area assigning method as claimed in claim 1, wherein:

the identifiers of the base stations comprise at least one of cell IDs, and scrambling code IDs.

5. The tracking area assigning method as claimed in claim 1, further comprising the step of:

receiving, by the user terminal, from the base station information about whether the user terminal needs to report the identifiers to the tracking area management apparatus; wherein the step of reporting comprises reporting the identifiers and the times of day when the user terminal needs to report the identifiers to the tracking area management apparatus.

6. The tracking area assigning method as claimed in claim 1, further comprises the step of:

updating, by the tracking area management apparatus, the prestored pattern when the reported identifiers match the prestored pattern and when the time difference between cell selections is within the prestored time frame in the step of assigning.

7. The tracking area assigning method as claimed in claim 1, further comprises the steps of:

determining, by the tracking area management apparatus, the movement speed of the user terminal; and controlling, by the tracking area management apparatus, the tracking area assigned to the user terminal based on the movement speed of the user terminal.

8. A user terminal for reporting to a tracking area management apparatus a trace along which the user terminal has moved in a mobile communication system, comprising:

an identifier storage unit configured to store identifiers of base stations where the user terminal has performed cell selection and times of day at which the user terminal has performed cell selection;

a trace reporting unit configured to report to the tracking area management apparatus the identifiers and the times of day stored in the identifier storage unit upon communicating with a base station; and a receiving unit configured to receive a tracking area assigned by the tracking area management apparatus according to a prestored pattern stored in the tracking area management apparatus, when the reported identifiers match the prestored pattern and when the time difference between cell selections which is calculated from the reported times of day is within a prestored time frame stored in the tracking area management apparatus.

9. A tracking area management apparatus for assigning a tracking area to a user terminal in a mobile communication system, comprising:

an identifier receiving unit configured to receive from a base station identifiers of base stations where the user terminal has performed cell selection and times of day at which the user terminal has performed cell selection; and a control unit configured to compare the received identifiers with a prestored pattern compare a time difference between cell selections which is calculated from the received times of day with a prestored time frame, and assign the tracking area to the user terminal according to the prestored pattern, when the received identifiers match the prestored pattern and when the time difference between cell selections is within the prestored time frame.

* * * * *